United States Patent
Abdulhayoglu

(10) Patent No.: US 7,296,053 B2
(45) Date of Patent: Nov. 13, 2007

(54) COMMUNICATING USER INFORMATION BETWEEN MERCHANT COMPUTERS WITH DESIGNATED SECURITY AND CONFIDENCE LEVELS

(76) Inventor: Melih Abdulhayoglu, 11 Northcote Street, Farsley, Leeds, West Yorkshire LS28 5AR (GB)

( * ) Notice: Subject to any disclaimer, the term of this patent is extended or adjusted under 35 U.S.C. 154(b) by 644 days.

(21) Appl. No.: 10/339,578

(22) Filed: Jan. 10, 2003

(65) Prior Publication Data
US 2003/0154140 A1    Aug. 14, 2003

(30) Foreign Application Priority Data
Jul. 12, 2000    (GB)    ................................ 0017300.5

(51) Int. Cl.
  G06F 15/16    (2006.01)
  G06Q 30/00    (2006.01)
  G06Q 40/00    (2006.01)
  G06F 7/04    (2006.01)
(52) U.S. Cl. ........................ 709/203; 709/250; 705/26; 705/36; 726/2; 726/26
(58) Field of Classification Search .................... None
  See application file for complete search history.

(56) References Cited

U.S. PATENT DOCUMENTS

| | | | |
|---|---|---|---|
| 2001/0037407 A1* | 11/2001 | Dragulev et al. | 709/250 |
| 2002/0016922 A1* | 2/2002 | Richards et al. | 713/200 |
| 2003/0115126 A1* | 6/2003 | Pitroda | 705/36 |

* cited by examiner

Primary Examiner—Wen-Tai Lin
(74) Attorney, Agent, or Firm—Richard Rowley; Bryan Brynner

(57) ABSTRACT

The present invention discloses a communication method for use between a first computer node (2) with pre-stored first computer node information and a plurality of other computer nodes (M1, M2, Mn), the first computer node and the other computer nodes being connected by a distributed electronic network, the method comprising the steps of providing an information request and the first computer node pre-stored information to at least one of the other computer nodes, and the at least one other computer node adaptively providing the first computer node with information in response to the information request according to the first computer node pre-stored information; in which the first computer node pre-stored information is in addition to the first computer node internet protocol address. A corresponding computer system is also disclosed.

10 Claims, 2 Drawing Sheets

COMMUNICATING USER INFORMATION BETWEEN MERCHANT COMPUTERS WITH DESIGNATED SECURITY AND CONFIDENCE LEVELS

FIELD OF THE INVENTION

The present invention relates to communication methods and systems as well as to merchant web-sites.

BACKGROUND TO THE INVENTION

As the growth in access to the internet continues, many web-sites are being developed to sell products via the internet: so called e-commerce. However, despite the proliferation of such sites, it is not noticeably any easier for prospective purchasers to find out information about products they want to purchase and to ensure they are getting a good deal when buying over the internet. For instance, if a prospective purchaser wishes to obtain a specific product, it is very time consuming to visit the vast range of sites from which it could be purchased and in each case to find the desired product and obtain the relevant information about the product in a useful and compatible format. For instance, a first site may offer products for sale in US Dollars whereas a second site may offer the same product for sale in Pounds Sterling.

It is an aim of preferred embodiments of the present invention to overcome at least one disadvantage of the prior art.

SUMMARY OF THE INVENTION

In a first aspect, according to the present invention there is provided a communication method for use between a first computer node with pre-stored first computer node information and a plurality of other computer nodes, the first computer node and the other computer nodes being connected by a distributed electronic network, the method comprising the steps of providing an information request and the first computer node pre-stored information to at least one of the other computer nodes, and the at least one other computer node adaptively providing the first computer node with information in response to the information request according to the first computer node pre-stored information.

Thus, the first computer node pre-stored information is in addition to the first computer node internet protocol address if relevant.

The pre-stored information generally is a user profile.

Suitably, the pre-stored first computer node information is provided to the at least one other computer node according to the present invention the first time the first computer node contacts the at least one other computer node.

Suitably, the pre-stored first computer node information is stored by the first computer node locally.

Suitably, the pre-stored information comprises communication information and marketing information.

The communication information can be for the other computer nodes, typically merchants, adaptively to provide the first computer node, typically a potential or actual customer, with product information, while marketing information can be about the first computer node.

So, for instance, the first computer node pre-stored information may comprise information about the user of the first computer node such as the currency the user desires product price information to be supplied in, whether prices should be quoted with or without delivery charges, the language in which the user wishes to communicate, whether weights and measures should be in imperial, metric or other units, whether pictures of products are required in a response, whether the user wants other product information such as availability, delivery times, possible alternative products that could be offered etc. The information, therefore, can be about the product, its pricing, delivery or other characteristics.

So, from a set of information it is possible for each of the other computer nodes to supply to the first computer node, only a selection (ie a sub set) of the available information (and which then can be displayed) according to the first computer node pre-stored information.

The other computer nodes can provide the information without the need to compare the first computer node's internet protocol address with any previous use by the first computer node of the other computer node's site and is not reliant on any such prior use. In this way it differs substantially from what is known as a cookie.

Suitably, the first computer node submits a product request to a product database, which product database provides the first computer node with a product identifier for submission to the at least one other computer node. The product request may be made after an inspection of the product database (in a catalogued format) by the first computer node.

Suitably, the at least one other computer node provides product information to the first computer node by modifying the content or manner of provision of its information according to the first computer node pre-stored information. Thus, for instance, a merchant may provide information in the currency desired by the user of the first computer node, the language desired, or in a price or presentational format set out by the user and/or information concerning the product.

Such a method has a particular advantage in that the other computer nodes do not require any pre-stored information of its own about the first computer node. The other computer nodes can provide dynamic time variable information to the first computer node, such as price or availability information.

It is possible therefore for a merchant dynamically to provide information to a user upon a first request without having to look up information corresponding to the user from their internet protocol address from a previous visit as might be the case if a "cookie" (which provides the internet protocol address only) were to be used.

Suitably, additionally a user obtains trust information in relation to another computer node and adaptively submits user profile (marketing) information to the at least one other computer node according to the trust information. Thus, a site may include a digital hallmark (which the user can verify independently) indicating the security level or type of site and the user can set up its user profile to have a plurality of formats according to the security level or site type. For instance a first format could provide simply the name and address of the user, a second format could provide the name, address, age and sex of the user, while a third profile could provide all of the above plus the marital status, interests, income and any other information desired about the user. The higher level of trust of the site the more information can be provided by the user to the site.

Suitably, there is a rule set of the at least one other computer node for receiving the first computer node pre-stored information and providing information adaptively dependent on the pre-stored information.

Suitably, there are a plurality of computer nodes corresponding to the first computer node, each with substantially unique pre-stored user information.

Suitably, the at least one other computer node is configured to retain pre-stored user information submitted to it.

The request and pre-stored information usually is provided to a plurality of other computer nodes.

The request may be a product request. In this specification a "product" can be a service.

According to the present invention in a second aspect, there is provided a computer system comprising a first computer node connected to a plurality of other computer nodes by a distributed electronic network, the system being configured whereby an information request and first computer node pre-stored information can be provided to at least one of the other computer nodes, and the at least one other computer node adaptively provides the first computer node with information in response to the information request according to the first computer node pre-stored information.

Suitably, the at least one of the other computer nodes is configured to retain pre-stored user information submitted to it.

Accordingly, a user provides data of his/her own to assist the merchant in providing him/her with the data he/she desires. Further, the merchant gains useful user (and hence customer) profile information.

BRIEF DESCRIPTION OF THE DRAWINGS

The present invention will now be described, by way of example only, with reference to the drawings that follow; in which.

DESCRIPTION OF THE PREFERRED EMBODIMENTS

Figure 1:
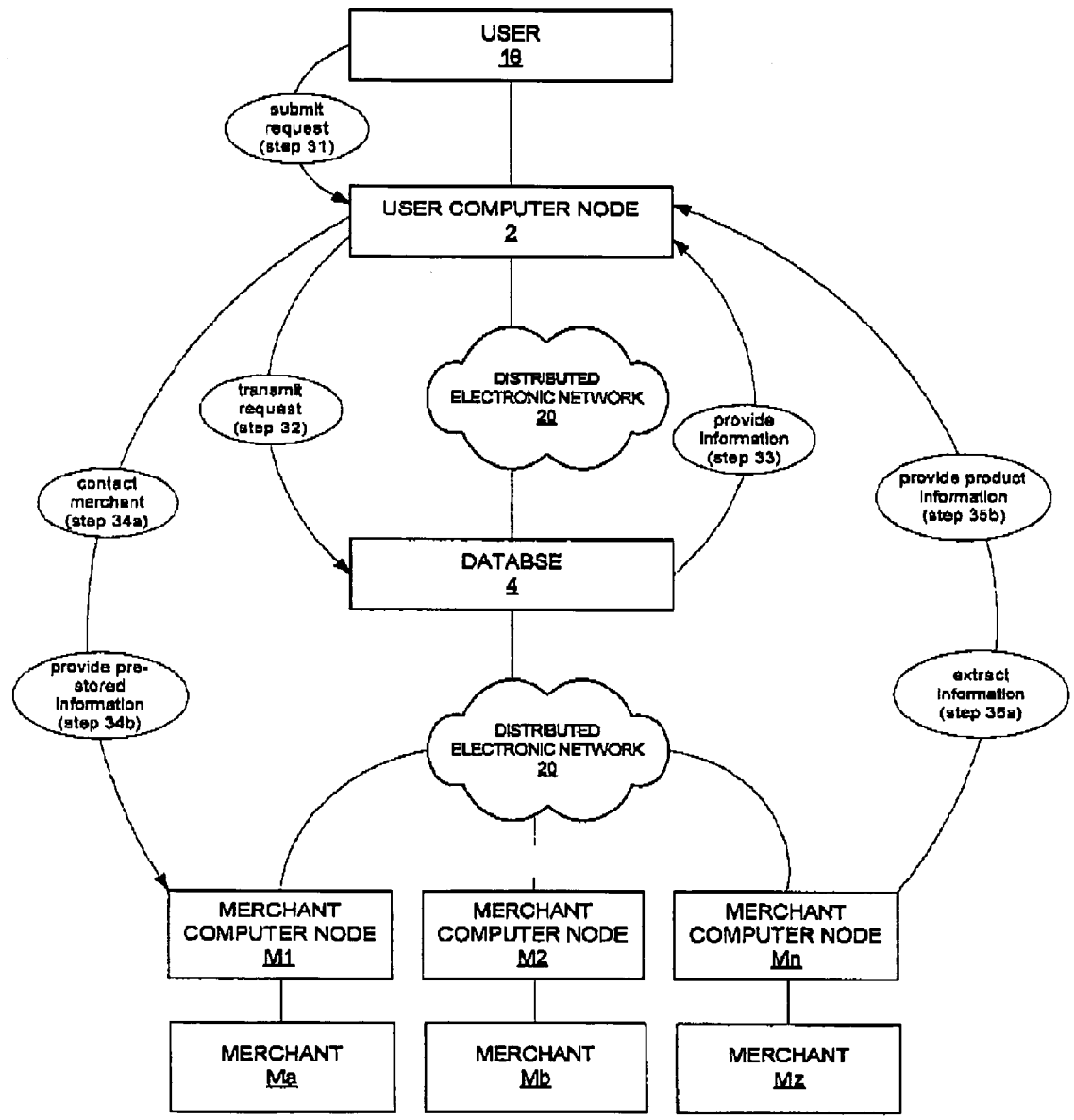
FIG. 1 is a schematic illustration of a way in which the present invention can be put into effect in a preferred embodiment.

Referring to FIG. 1, in this preferred embodiment of the present invention a user's computer node 2 is connected to a database 4 and to a plurality of merchant's computer nodes M1, M2 . . . Mn offering goods or services (ie products) for sale. These connections are via a distributed electronic network 20 such as the internet (also known as the worldwide web), although some or all of the connections could be via other distributed electronic networks such as via mobile phones, a local area network or wide area network.

Typically, the communications will be between digital computers of the user's computer node 2, database 4 and merchant's computer nodes M1, M2-Mn.

Figure 2:
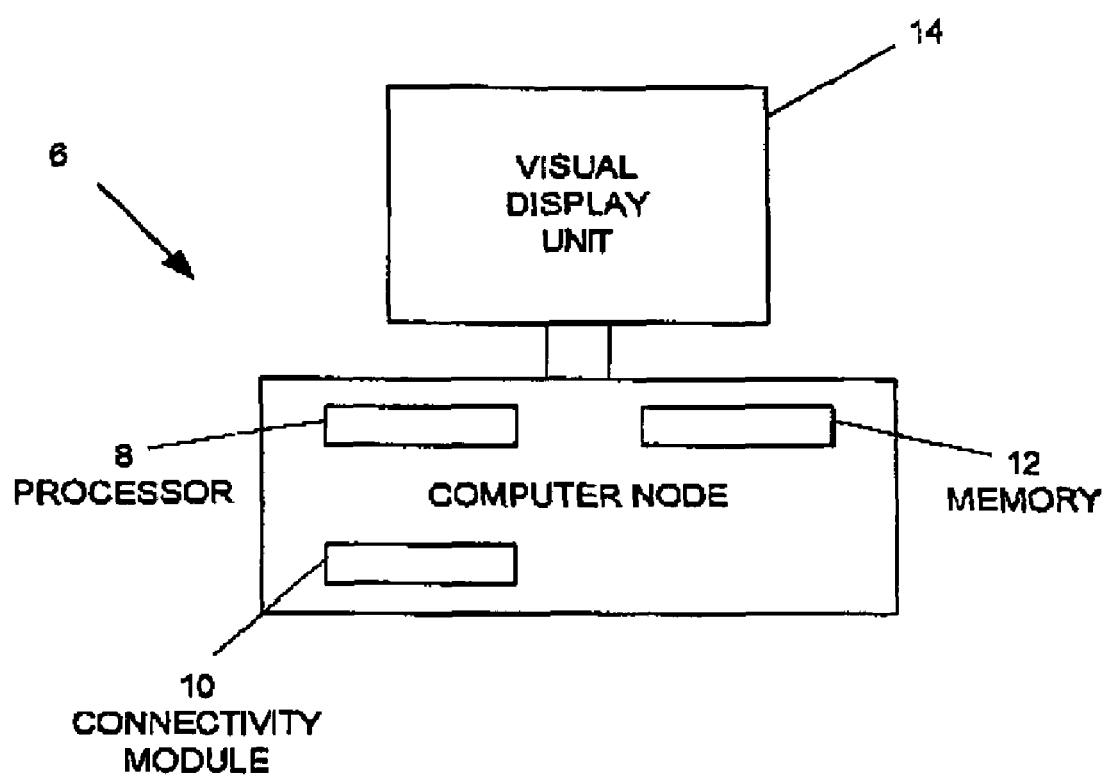
FIG. 2 is a schematic illustration of a computer node for use with the FIG. 1 embodiment.

Referring to FIG. 2, a computer node 6 typically will comprise a processor 8 having a connectivity module 10 (such as a modem) for connection to a distributed electronic network, a memory 12 and a visual display unit 14. The users and merchant computer node may, but need not, be similar. Various connectivity architectures, eg using servers, thin client interfaces etc can be used to implement the present invention.

The present invention is implemented by appropriate computer software within the ambit of a person skilled in the art.

A user enters information onto the user computer node 2. This information falls into two categories: communication and marketing.

Communication information is that which assists in the merchants providing the user with information in a format desired by the user. So, for instance, this may include the currency in which the user wishes to carry out a transaction, the language the user wishes to use, whether information should be provided with or without images (and if so in which format), download file type (e.g. PDF or WORD (trade mark)), date format (eg US or English), weights and measures (eg imperial or metric), what information of that available the user wishes to be provided with in connection with the desired product etc. A typical list of information required to be kept on each product is set out below:

Product Information:
    Name (identifier)
    Description
    Category
    Good or service
    Price
    Size
    Weight
    Colour
    Material
    Unique user specifications
    Ingredients
    Storage specifications (best kept at . . . )
    Fresh/Frozen/Processed
    Liquid/Solid/Gas
    Seasonable Availability
    Packaging
    Number of products per individual order
    Additional necessary products to purchase (i.e. batteries)
    Association Products (complements)
    Hazardous
    Genetically modified
    Age classification
    Barcode or UPC of the product Special Offer Information:
    Special offer code (% discount, 2 for 1, offer through combines product purchase, etc)
    Expiry date of Special offer Manufacturer Information:
    Company Name (identifier)
    Registered Company Name
    Contact details
    Manufacturing date
    Country of origin Location Number:
    Legal entities (subsidiary, etc)
    Functional entities (specific department within the legal entity)
    Physical entities (particular room within the functional entity)
    Manufacturer Rating Merchant Information:
    Merchant Name (identifier)
    Location
    Contact details
    Security Details—company house identification
    Payment details
    Shipping Costs
    Return Policy
    Warranty Information
    Availability
    Immediate Delivery Made to order Merchant Feedback (Provided by Customers):
  Customer service
  Returns problems
  Payment problems
  Additional problems
  Speed of delivery Product Feedback (Provided by Customers):
  Rating (consumer rating of individual product)
  Press Releases/Manufacturer web pages re individual product.

The marketing information is that which is desired by the merchants and may include: name, address, age, sex, marital status, whether a car owner (and if so further details), home owner (and if so, further details), number of children and interests etc.

The marketing and communication information is requested from the user in a standard hypertext form format.

The lists given above for both the communication and marketing information are non-exhaustive.

Once entered, this information is stored locally on the user's computer node 2 (typically on their hard drive) and becomes pre-stored user computer node information. Alternatively the information may be stored elsewhere and is provided to the merchant's computer node or obtained by them by being referred to it, eg on a web-site.

The database 4 contains a listing of available products in a catalogued format. The products may be catalogued using any appropriate cataloguing system. For instance, they may be catalogued according to the international (Nice) trademark classification system to help a user find the appropriate product as quickly as possible. The product classification can be as detailed as desired. Each product listed in the database has a corresponding unique identification number so that once a user selects the desired product, the database 4 informs the computer node 2 of the corresponding product number and with a list of associated merchant websites that sell the product. The information is stored in a relational database.

Any cataloguing system can be used and many are already available via existing internet shopping sites.

Each of the merchants has a database with full product details cross-referenced with product numbers corresponding to those stored at database 4.

To use the system a user 16 submits a product information request from its user computer node 2 (step 31), and the user computer node 2 transmits the request to the database 4 (step 32). In this preferred embodiment this is done by the user 16 accessing an internet web site based on the product database 4 which allows the user 16 to select a desired product. The level of product selection can be fully detailed down to specific weights of product, e.g. a 500-gram jar of NESCAFE (trade mark) coffee. The product database 4 is then interrogated and supplies the user computer node 2 with a unique product identification number and a list of web-site addresses (the merchants) from which the product is available (step 33).

The user computer node 2 then automatically contacts the website addresses of the merchants Ma, Mb . . . Mz (ie the merchants' computer nodes M1, M2-Mn) provided to the user computer node 2 by the product database 4 (step 34a). To each merchant computer node M1, M2-Mn the user computer node 2 provides the user's pre-stored information, which is in addition to the user's internet protocol address, the latter being supplied to a visited site as a matter of course (step 34b). Each merchant computer node M1, M2-Mn has the user's communication data supplied to it and all or part of the marketing information (see below). The merchants Ma, Mb-Mz or merchant computer nodes M1, M2-Mn use the unique product identifier to identify the specific product of interest in their database.

Each merchant computer node M1, M2-Mn includes a rule-set typically held locally in memory 12 of a computer node. The rule-set determines how information is to be supplied to the user computer node 2 dynamically according to the pre-stored information. So, for instance, if the user 16 requests prices in Sterling and measures in Imperial, the information is so provided.

Each merchant stores the marketing information for its own use.

The merchant computer node Mn extracts the communication information (step 35a) and uses this to present to the user 16 the desired information about the Merchant's Mz product and associated characteristics such as delivery times, methods, transaction security, etc. (step 35b). The user 16 then has this information displayed on the screen of the user computer node 2 in the desired format so the user 16 can then make a direct comparison between the various products on offer based on his desired criteria.

The communication information may also include pre-requisites for a merchant's web-site/computer node to be considered by a user. For instance a user may only be willing to deal with a merchant having an acceptable returns policy and products priced within 10% of the cheapest price on returned hits to be displayed.

The merchant computer node M provides information in response to an information request based on preferences supplied from the user. The merchant can supply the information in a number of ways, one or more of which is specified by the user in the pre-stored information. This can be achieved at the first communication between user and merchant. Thus the user pre-stored information is provided in a predetermined configuration.

The merchants may provide a hyperlink to enable the user to purchase the desired product from them. Alternatively a shopping cart may be provided.

Referred to above is the fact that not all of the marketing information will be provided to all merchants. Rather merchants may be characterized in to different groups dependent on the merchant's characteristics. Various characteristics may determine the groupings, but in this preferred embodiment merchants are characterized by a confidence rating which encompasses features such as the security of payment, confidentiality of information supplied, etc. The product database administrators supply the rating. According to the rating supplied by the database to a merchant, the level of marketing information supplied varies. For instance, if a merchant has a low confidence rating, a user will only supply the most basic marketing information such as their name and country of origin. For a merchant with a high confidence rating, all marketing information may be supplied and there can be any number of levels in between.

In an alternative embodiment the grouping of the merchants can be based on a subscription service. That is merchants must subscribe at different levels to obtain different amounts of marketing information from the users.

This method and system enables a user to obtain full product information is a desired format, the same format being supplied by a plurality of merchants even if it is the first time the user has contacted that merchant. The product database is not required to attempt to keep track of merchant price fluctuations or delivery problems, these are supplied direct to the user by the merchants.

Even those merchants not selected by the user to purchase the product have valuable marketing information because they can see the type of person interested in their products, which are the more popular etc.

In an alternative embodiment of the present invention, the product section is made at a merchant's computer node (from the merchant's web-site) by the user and the pre-stored user information is used by the merchant's web-site to adaptively provide information on the product to the user.

Although the described embodiments of the present invention are in relation to products, it can be utilised in relation to any information request by making the information supplied user specific.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A communication method for use between a user computer node with pre-stored user computer node information and a plurality of other merchant computer nodes, the user computer node and the other merchant computer nodes being connected by a distributed electronic network, the method comprising the steps of the user computer node:
   submitting a product request to a product database;
   receiving from said product database a unique product identifier for said product requested and contact information for a plurality of merchants offering said product;
   contacting the merchant computer node of at least one of said merchants;
   providing the pre-stored user computer node information and product identifier to said merchant computer nodes; and
   verifying a digital hallmark of a website, wherein said hallmark indicates the security level or type of website
   obtaining a confidence rating of another computer node
   submitting user information according to the confidence rating of the other computer node where the user information can be configured to have a plurality of formats according to the security level or website type
   receiving product information from said merchant computer node in response to the product information request, wherein said product information is adapted according to the pre-stored user computer node information provided to said merchant computer node.

2. A communication method according to claim 1, in which the pre-stored user computer node information is provided to the merchant computer node the first time the user computer node contacts the merchant computer node.

3. A communication method according to claim 1, in which the pre-stored user computer node information is stored by the user computer node locally.

4. A communication method according to claim 1, in which the pre-stored information comprises communication information and marketing information.

5. A communication method according to claim 1, further comprising the user computer node receiving a product information request from a user.

6. A communication method according to claim 5, in which the product information request is made after an inspection of the product database (in a catalogued format) by the first computer node.

7. A communication method according to claim 5, in which the content or manner of receipt of the product information received by the user computer node is modified according to the user computer node pre-stored information.

8. A communication method according to claim 1, wherein said product information is adapted according to the pre-stored user computer node information by a rule set for receiving-the pre-stored user computer node information.

9. A communication method according to claim 1, in which there are a plurality of computer nodes corresponding to the user computer node, each with substantially unique pre-stored user computer node information.

10. A computer system comprising a user computer node connected to a plurality of other merchant computer nodes by a distributed electronic network, the system being configured whereby an information request and pre-stored user computer node information can be provided to at least one of the other merchant computer nodes, whereby the user computer node verifies a digital hallmark of a website where the hallmark indicates the security level or type of website and the user node obtains a confidence rating of at least one of the merchant computer nodes, whereby the user computer node submits user information according to the confidence rating of at least one of the merchant according to the security level or website type, and the user computer node is configured to receive from the at least one other merchant computer node information adapted in response to the information request according to the user computer node pre-stored information.

* * * * *